United States Patent [19]
Lemelson

[11] 3,864,514
[45] Feb. 4, 1975

[54] FACSIMILE SYSTEM AND METHOD

[76] Inventor: Jerome H. Lemelson, 85 Rector St., Metuchen, N.J. 08840

[22] Filed: Oct. 24, 1972

[21] Appl. No.: 300,424

Related U.S. Application Data

[63] Continuation-in-part of Ser. No. 225,172, Aug. 27, 1962, , which is a continuation-in-part of Ser. No. 668,348, June 27, 1957, Pat. No. 3,051,777, which is a continuation-in-part of Ser. No. 823,600, May 12, 1969, which is a continuation-in-part of Ser. Nos. 279,030, April 1, 1963, abandoned, and Ser. No. 723,075, Feb. 28, 1958, Pat. No. 3,084,213.

[52] U.S. Cl. .................... 178/6.8, 178/6, 178/6.7 R
[51] Int. Cl. .............................................. H04n 1/32
[58] Field of Search ....................... 178/6.7 R, 6, 6.8

[56] References Cited

UNITED STATES PATENTS 2,611,027 9/1952 Hammond ....................... 178/6.7 R
2,889,399 6/1959 Hammond ..................... 178/6.7 R

*Primary Examiner*—Howard W. Britton

[57] ABSTRACT

An apparatus and method are provided for generating, transmitting, receiving and recording video information such as page document information employing a modified television camera and receiver. The television camera is controlled in its operation so as to generate a full-frame video picture signal on its output when a trigger input thereto is energized after placing a flat document in the scanning field of the camera. The full frame video signal is automatically transmitted to a receiving station where it is applied to intensity modulate and deflection control the write beam of a video receiver. Hard copy generating means is optically coupled to the display screen of the receiver and is automatically controlled to generate a print of each image generated on said display screen.

7 Claims, 1 Drawing Figure

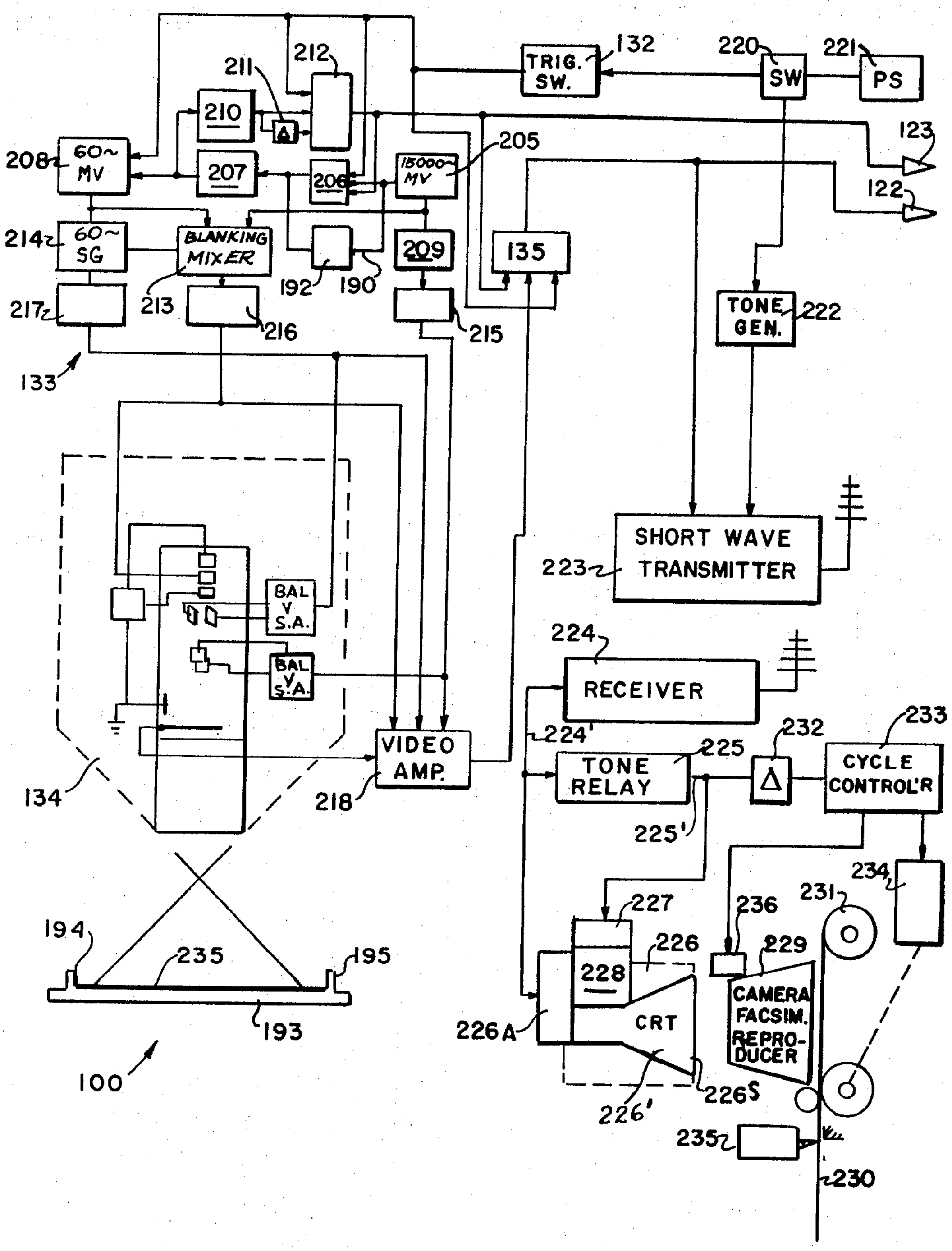
TRIG. SW.
SW
PS
SHORT WAVE TRANSMITTER
RECEIVER
TONE RELAY
CYCLE CONTROL'R
TONE GEN.
VIDEO AMP.
BLANKING MIXER
60~ MV
60~ SG
15000~ MV
BAL V S.A.
CRT
CAMERA FACSIM. REPRODUCER

FACSIMILE SYSTEM AND METHOD

RELATED APPLICATIONS

This is a continuation-in-part of application Ser. No. 225,172 filed Aug. 27, 1962, for Videotape Recording which was filed as a continuation-in-part of Ser. No. 668,348 filed June 27, 1957, now U.S. Pat. No. 3,051,777. This is also a continuation-in-part of Ser. No. 823,600 filed May 12, 1969 for Automatic Communication System, which was a continuation-in-part of Ser. No. 279,030 filed Apr. 1, 1963 now abandoned and having as a parent application Ser. No. 723,075 filed Feb. 28, 1958 for Facsimile Apparatus, now U.S. Pat. No. 3,084,213.

SUMMARY OF THE INVENTION

This invention relates to a facsimile apparatus and method for generating, transmitting and recording facsimile information by short wave, microwave link, cable or telephone lines.

Prior to the making of the instant invention, it was the practice to generate and transmit facsimile information by scanning a document, photograph or drawing disposed against a drum and electromechanically causing a photo electric cell to be driven in a path close to the drun above the cylindrical record member as it is rotated. Such a procedure is not only time consuming but requires the physical manipulation of the document or photograph and its adjustment on the drum so that it may be properly scanned. In other words, the document or photograph must be so dimensioned that it will completely wrap around the drum and must be positioned accurately thereon a procedure which requires considerable effort on the part of the operator.

The instant invention employs a conventional cathode ray tube television camera, the deflection control circuits for which and their controls have been modified to permit the initiation and completion of a so called full-frame image field scan upon receipt of a trigger pulse. Depending upon the communication channel employed, scanning may be effected at conventional television signal generating frequency or at so called slow-scanning rate. The document need only be disposed within the scanning field after which scanning may be effected by simply generating a trigger pulse. Accordingly it is a primary object of this invention to provide a new and improved facsimile apparatus and a method of generating, transmitting and recording facsimile information without the need for substantial human effort, if any at the signal generating station and without requiring human attendance at the receiving station.

Another object is to provide a new and improved apparatus and method for transmitting document information at a high transmission rate and without the delays experienced in conventional facsmilie systems.

Another object is to provide a facsimile apparatus which is substantially totally electronic at the sending station and is void of electro mechanical apparatus at the receiving station, thereby reducing maintainance requirements.

Another object is to provide a facsimile apparatus wherein a plurality of documents may be transmitted, received and recorded without complex procedures.

Another object is to provide an apparatus and method for transmitting facsimile information on conventional telephone lines without the need for human attendance.

With the above and such other objects in view as may hereafter more fully appear, the inventions consists of the novel constructions, combinations and arrangements of parts as will be more fully described and illustrated in the accompanying drawings, but it is to be understood that changes, variations and modifications may be resorted to which fall within the invention as claimed.

In the drawing:

FIG. 1 is a schematic diagram showing the basic components and sub-systems of the apparatus defined in the instant invention.

The single drawing illustrates the components and subsystems which comprise the facsimile system of the instant invention in block diagram notation. Where not illustrated, it is assumed that the correct power supplies are provided on the correct sides of all amplifiers, switches, relays, motors, motor controls, delays, signal generators, transmitter and receivers. Such power supplies have been eliminated in order to simplify the drawings.

Also it is noted that while short wave communication means is provided in the drawing to transmit full-frame video picture signals of documents scanning by a video camera to a remote location whereit it is recorded, other forms of communication may also be employed such as cable, wire pairs, laser beam communication, microwave links and telephone lines.

FIG. 1 illustrates a facsimile apparatus 100 which employs a conventional television camera 134 to scan documents 235 disposed in its scanning field and to generate at the final stage 218 of video amplification a composite video picture signal after a trigger input is energized. The composite picture signal is then transmitted to a receiving station where it is applied to intensity modulate the write-beam of the a modified television receiver to generate an image on the screen of the cathode ray tube thereof which is then applied to form hard copy. The entire procedure may be effected automatically after a start cycle switch 220 is closed, momentarily gating a pulse from a power supply 221 to energize a start switch 132 which is operable to initiate control of the deflection control circuits 133 for the camera 134 which controls the read-beam thereof to execute a full-frame scan of the image field thereafter.

The deflection control circuitry which contains multivibrator circuits 205 and 208, signal generators 209 and 214, a blanking mixer 213 and sync signal amplifiers 215, 216 and 217, is described in U.S. Pat. NO. 3,051,777 and is designed such as to cause the read--beam of camera 134 to be deflection controlled in effecting a full-frame scanning of the image field thereof upon activation of switch 132, after which full-frame scanning the beam ceases to be controlled and is blanked until switch 132 is again energized.

The output of switch 220 also extends to a tone signal generator 222, the output of which is connected to the transmitter 223 which also receives the composite video picture signal. The transmitter 223 may comprise a short wave transmitter, the output signals of which are transmitted to and received by a short wave receiver 224 having an output 224' which is connected both to a tone responsive relay 225 and the input circuits 226A for a television receiver 226 which includes a cathode ray tube 226', vertical and horizontal beam deflection means 228, a signal activated control switch 227 for gating suitable electrical energy for conditioning the receiver 226 and the recording means of the cathode ray tube to record information on its image screen 226S and input circuitry 226A for the composite video signals generated by camera 134, which circuitry includes conventional means for separating the sync signals from the picture signals and applying same respectively to the deflection plates or coils of the deflection means 228 and the beam mudulation input for the cathode ray tube 226'. The tone responsive relay 225 is operable to become activated upon receiving a tone signal generated by generator 222 and transmitted to receiver 224. Output 225' of relay 225 is connected through a suitable time delay relay 232 to a printer controller 233, a self-recycling multicircuit timer adapted to control operation of a hard copy printer to be described. Tone relay 225 is also shown connected to close control switch 227 to condition television receiver 226 for recording. The composite video picture signal which is received by receiver 224 after tone relay 225 is energized by the signal generated by tone generator 222, is then applied to input circuitry 226A and is operable to control the write-beam of the tube 226' and generate an image of the document scanned by camera 134 on the display screen 226S of tube 226'. In another form of the invention requiring less bandwidth for transmission, the video camera may be modified to generate only the video picture signal and the signal generated by tone generator 222 and regenerated as the output signal of tone relay 225 may be applied to suitable vertical and horizontal synchronizing signal generators at the receiving station for deflection controlling the beam of the cathode ray tube in synchronization with the received video picture signal so that the required picture information will be properly generated on the display screen of the tube 226'.

Thus the video picture signal generated by camera 134 is transmitted to and generates an image on the screen if the cathode ray tube 226' which image is photographed by a camera or facsimile reproduction device 229 at a predetermined time interval after the switch 220 is closed as determined by the time delay relay 232. The camera shutter or printer control 236 is activated by a signal generated by the print cycle controller 233 to cause a print of the image of the face of the cathode ray tube 226' to be effected on reproduction paper 230 which is driven from a supply roll 231 by a motor 234 which is controlled in its operation by the controller 233.

A motorized cutting knife 235 is also controlled by the print cycle controller 233 to cut off just that length of sheet 230 which has been exposed and printd with the image of the cathode ray tube 226'.

The switch 220 may be a manual switch closed by an operator after he has manually disposed a document of photograph 235 on a receiving table 193 between guides 194 and 195 thereof to position said document in the scanning field of the camera 134. The switch 220 may also be automatically closed when a document is fed to the table 193 and its position has been sensed by a limit switch which defines switch 220 or is connected thereto.

In the event it is desired to locally record the full-frame video picture signals generated each time the read-beam of the television camera 134 scans the image of a document for record keeping purposes, the magnetic tape recording arrangements disclosed in U.S. Pat. No. 3,051,77 may be employed which include the use of a video picture signal recording head 122 and a frame marker pulse recording head 123 shown in the drawing as connected to the respective output circuits on which such signals are generated. Reference is particularly made to FIG. 4' of U.S. Pat. No. 3,051,777 for further details of such a recording arrangement taken in consideration with the other disclosures found in said patent. Further descriptive details of the deflection control circuits 133 which are not fully described herein, may be found in application Ser. No. 225,173 and in U.S. Pat. No. 3,051,777.

I claim:

1. Facsimile apparatus for transmitting and recording full-frame video picture information comprising in combination:

a television camera, means for positioning a document containing a pictorial representation of information to be transmitted to a location remote from said camera, in the scanning field of said camera, said camera having a reading electron beam and deflection control circuits for causing the reading-beam of the camera to rpedeterminately scan the image field presented to the camera, signal generating means for generating a sequence of deflection control signals and applying said signals to energize said deflection control circuits of said camera to cause said camera reading beam to full-frame scan its image field, control means for said signal generating means including a control switch, an input circuit energized by closing said control switch for initiating operation of said signal generating means to generate and apply the signals generated thereby to said deflection control circuits whereby said reading beam is caused to full-frame scan the complete image field presented to the camera and to terminate the scanning action of said reading beam when the complete image field has been scanned thereby, means including said reading beam for generating a composite video picture signal on the output of said camera including separable picture and synchronizing signal elements, a receiving station, means for effecting a communication link between the output of said camera and said receiving station, receiving means at said receiving station operable for receiving the signals generated by said transmitting means, and including a video receiver having a cathode ray tube and write-beam generating means for generating an image on a display screen of said tube, horizontal and vertical deflection control means for the write-beam of said receiving station cathode ray tube connected to receive signals from said receiving means, means at said receiving station for separating said synchronizing signal elements from the picture signal elements from each composite video picture signal received thereby and applying said synchronizing elements to said horizontal and vertical deflection control means for said write-beam of said receiving station cathode ray tube and for simultaneously applying the separated picture signal elements to intensity modulate said write-beam of said cathode ray tube to cause said beam to full-frame scan and generate an image on the display screen of said tube which image is representative of the document scanned by said television camera, relay means connected to said receiving means of said receiving station and responsive to the code signal generated when said control switch is closed for conditioning said receiving means of said receiving station to receive signals generated by said sending station transmitting means, means optically coupled to said display screen of said receiving station cathode ray tube for generating a hard copy reproduction of images generated by said display screen, and means at said receiving station connected to said receiving means and responsive to the control signal received from said sending station for controlling the operation of said hard copy generating means to generate a hard copy print of the image displayed on the display screen of said cathode ray tube.

2. Facsimile apparatus in accordance with claim 1 wherein said means for establishing a communication link between the output of said camera and said receiving station comprises a short wave transmitter connected to the output of said camera and said receiving means at said receiving station comprises a short wave receiver having its output connected to said means at said receiving station for separating said synchronizing signal elements from the picture signal elements, said short wave receiver being operable to receive signals transmitted by said transmitter.

3. Facsimile apparatus in accordance with claim 1 wherein said code signal generating means at said sending station comprises means for generating a tone signal, said relay means connected to said receiving means at said receiving station being tone responsive and operable to generate a control signal on its output for conditioning said receiving means of said receiving station to receive signals from said sending station upon receipt of a tone signal generated by said tone generating means of said sending station.

4. Facsimile apparatus in accordance with claim 1 wherein said control switch is a manually operable electrical switch connected to initiate the operation of said television camera to cause its read-beam to full-frame scan its image field and to energize said code signal generating means.

5. Facsimile apparatus in accordance with claim 1 including means for prepositioning the document in the scanning field of said television camera, said control swtich being operable to sense the presence of a document presented to said prepositioning means and to become activated for operating said signal generating means.

6. Facsimile apparatus in accordance with claim 1, said automatic control means including cycle control means for said hard copy generating means operable to control the operation of said hard copy generating means to generate said hard copy print of the image appearing on the face of said display screen of said cathode ray tube at said receiving station.

7. Facsimile apparatus in accordance with claim 6 wherein said code signal generating means comprises a tone signal generator and said means at said receiving station responsive to the control signal received from said sending station comprises a tone responsive relay which relay is operable to control said automatic cycle control means for said hard copy generating means each time it initially receives a tone signal from said sending station.

* * * * *